United States Patent
Pilliod et al.

(10) Patent No.: US 9,109,093 B2
(45) Date of Patent: Aug. 18, 2015

(54) FORMATION OF STRUCTURAL COMPONENTS USING CERAMIC FIBERS

(75) Inventors: Michael K. Pilliod, San Francisco, CA (US); Paul Choiniere, Livermore, CA (US)

(73) Assignee: APPLE INC., Cupertino, CA (US)

( * ) Notice: Subject to any disclaimer, the term of this patent is extended or adjusted under 35 U.S.C. 154(b) by 161 days.

(21) Appl. No.: 13/040,116

(22) Filed: Mar. 3, 2011

(65) Prior Publication Data

US 2012/0076573 A1 Mar. 29, 2012

Related U.S. Application Data

(60) Provisional application No. 61/386,930, filed on Sep. 27, 2010.

(51) Int. Cl.
| | |
|---|---|
| *H04M 1/00* | (2006.01) |
| *C08J 5/04* | (2006.01) |
| *B29C 45/00* | (2006.01) |
| *C08L 77/00* | (2006.01) |
| B29K 303/04 | (2006.01) |
| B29L 31/34 | (2006.01) |

(52) U.S. Cl.
CPC .............. *C08J 5/044* (2013.01); *B29C 45/0005* (2013.01); *C08L 77/00* (2013.01); *B29C 45/0055* (2013.01); *B29C 2045/0058* (2013.01); *B29C 2793/009* (2013.01); *B29C 2793/0018* (2013.01); *B29K 2303/04* (2013.01); *B29L 2031/3437* (2013.01); *C08J 2355/02* (2013.01); *C08J 2367/02* (2013.01); *C08J 2369/00* (2013.01); *Y10T 403/47* (2015.01)

(58) Field of Classification Search
USPC .............. 403/265, 268, 269, 270; 455/575.1, 455/575.5, 575.7; 524/430, 431, 432, 433
See application file for complete search history.

(56) References Cited

U.S. PATENT DOCUMENTS

| | | | |
|---|---|---|---|
| 862,786 A * | 8/1907 | Ashcraft | 403/269 |
| 1,747,964 A * | 2/1930 | Wirth | 403/265 |
| 2,650,943 A * | 9/1953 | Leuchs et al. | 403/265 |
| 6,150,446 A | 11/2000 | Numata | |
| 6,414,067 B2 | 7/2002 | Katsube et al. | |
| 7,462,656 B2 | 12/2008 | Keulen et al. | |
| 8,359,078 B2 * | 1/2013 | Hung | 455/575.8 |
| 2006/0110599 A1 | 5/2006 | Honma et al. | |
| 2009/0156715 A1* | 6/2009 | Dueber et al. | 524/432 |
| 2010/0130656 A1 | 5/2010 | Ikematsu | |
| 2010/0203931 A1* | 8/2010 | Hynecek et al. | 455/575.8 |

\* cited by examiner

*Primary Examiner* — Michael P Ferguson
(74) *Attorney, Agent, or Firm* — Brownstein Hyatt Farber Schreck, LLP

(57) ABSTRACT

Materials, apparatus and methods of forming structural components for consumer electronics devices are described. In one embodiment, ceramic fibers, such as alumina, are mixed with a thermoplastic, such as nylon, to form a composite material usable in an injection molding process. The volume percent of ceramic fibers used with the thermoplastic can be selected to improve the strength properties of the composite material. Pigments can be added to the composite material to affect its aesthetic appeal. In one embodiment, the composite material including the ceramic fibers can be used to form frame components usable in a consumer electronic device. The frame components can be load bearing structures that are externally visible or used within the interior of the device.

19 Claims, 7 Drawing Sheets

FORMATION OF STRUCTURAL COMPONENTS USING CERAMIC FIBERS

CROSS REFERENCE TO RELATED APPLICATIONS

This application claims priority under 35 U.S.C. §119(e) from co-pending U.S. Provisional Patent Application No. 61/386,930, filed Sep. 27, 2010, titled "FORMATION OF STRUCTURAL COMPONENTS USING CERAMIC FIBERS," which is incorporated by reference and for all purposes.

BACKGROUND

1. Field of the Invention

The invention relates to enclosure design for consumer electronic devices and more particularly, methods, apparatus and materials for forming internal and external frame components for electronic devices.

2. Description of the Related Art

In recent years, portable computing devices such as laptops, PDAs, media players, cellular phones, etc., have become small, light and powerful. One factor contributing to this reduction in size can be attributed to the manufacturer's ability to fabricate various components of these devices in smaller and smaller sizes while in most cases increasing the power and or operating speed of such components. Another factor contributing to the reduction in size is that from a visual stand point, users often find compact and sleek designs of consumer electronic devices more aesthetically appealing and thus, demand compact and sleek designs. The trend of smaller, lighter, more compact and powerful presents continuing challenges in the design portable computing devices and its associated components.

One approach that is used to make smaller, lighter and more compact devices is to design multi-purpose components. For example, portable devices often have wireless communication mechanisms, in order to provide wireless communications between the portable device and base stations, cell phone towers, desktop computers, etc. If the wireless communication mechanisms are integrated into other components, such as part of load bearing elements (e.g., external or then internal portions of the frame), then it can be possible to decrease the size of the portable device.

To utilize a portion of the frame as an antenna, it may be necessary to provide RF (Radio Frequency) isolation. The RF isolation allows the portion of the frame used as an antenna to be properly tuned to receive the frequencies the device needs to operate wirelessly. The RF isolation can be accomplished by utilizing materials with different conductive properties within the frame. From a design point view, it is challenging to find materials that are both strength compatible and can be integrated together in an aesthetically pleasing way. Thus, in view of above, methods, apparatus and materials are desirable that allow multi-purpose frame components to be designed.

SUMMARY

Broadly speaking, the embodiments disclosed herein describe methods, apparatus and materials for forming frame components well suited for use in consumer electronic devices, such as laptops, cellphones, netbook computers, portable media players and tablet computers. In particular, materials as well as methods and apparatus for forming device components, such as load-bearing frame components, useable in a light-weight consumer electronic device with a thin and compact enclosure are described. In one embodiment, a ceramic fiber can be mixed with a thermoplastic to form a material that can be used in an injection molding unit. The injection moldable material can be used to form a device component alone or in combination with other materials. For instance, using an injection molding process, the material can be used to join a number of metal components together to form a load bearing structure where the material provides 1) RF isolation between the metal components, 2) is strength compatible with the metal components and 3) is aesthetically compatible with the metal components. Materials, methods and apparatus that can be used to form various device components are described as follows.

In one aspect, a material mixture including a ceramic fiber and thermoplastic is described. The ceramic fiber can be coated to allow it bond to the thermoplastic. In a particular embodiment, the ceramic fibers and the thermoplastic can be used to form a relatively non-conductive polymer with a tensile module of about 20 GPa or greater. In particular, the ceramic fibers can have a density between 2.5 g/cc-7 g/cc. Further, the tensile modulus of the ceramic fiber filaments can be between about 100 GPa-450 GPa.

The ceramic fibers can be selected to be relatively non-conductive. For instance, the dielectric constant of the ceramic fibers can be between about 4-35. In one embodiment, the ceramic fibers can be formed from a metal oxide, such as alumina. In one embodiment, the ceramic fibers can be less than 35 volume percent of the material mixture. The material mixture properties, such as the strength and over-all conductance, can be varied by changing the percent volume loading of the ceramic fibers used in the material mixture. In particular embodiments, the fiber loading in the mixture can be selected to meet a desired material mixture performance.

Various thermoplastics can be combined with the ceramic fibers. A few examples include but are not limited to a polymer matrix, nylon, polycarbonate (PC), Polybutylene terephthalate (PBT), PBT/PC blends, Acrylonitrile Butadiene Styrene (ABS) and PC/ABS blends. In a particular embodiment, a material including ceramic fibers, glass fibers and a thermoplastic can be also used. The volume loading of the ceramic fibers and glass fibers can be varied to meet material mixture performance objectives and to satisfy cost and availability constraints associated with each material component. For instance, glass fibers can be less expensive and more available than ceramic fibers. Thus, it may be advantageous to use a combination of ceramic and glass fibers as filler with a thermoplastic.

In one embodiment, the material mixture including the ceramic fibers can be used in an injection molding process. For instance, the material mixture can be used in an injection molding process to join but provide RF isolation between two metal components used in an external frame for an electronic device. In another example, the material mixture can be used to form a device component, such as an internal frame component, in an injection molding process. In a particular, the ceramic fibers can be formed into sheets and wrapped around a forming element to generate a device component, such as an enclosure. The sheets can be bonded together using an organic resin to form a composite structure.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
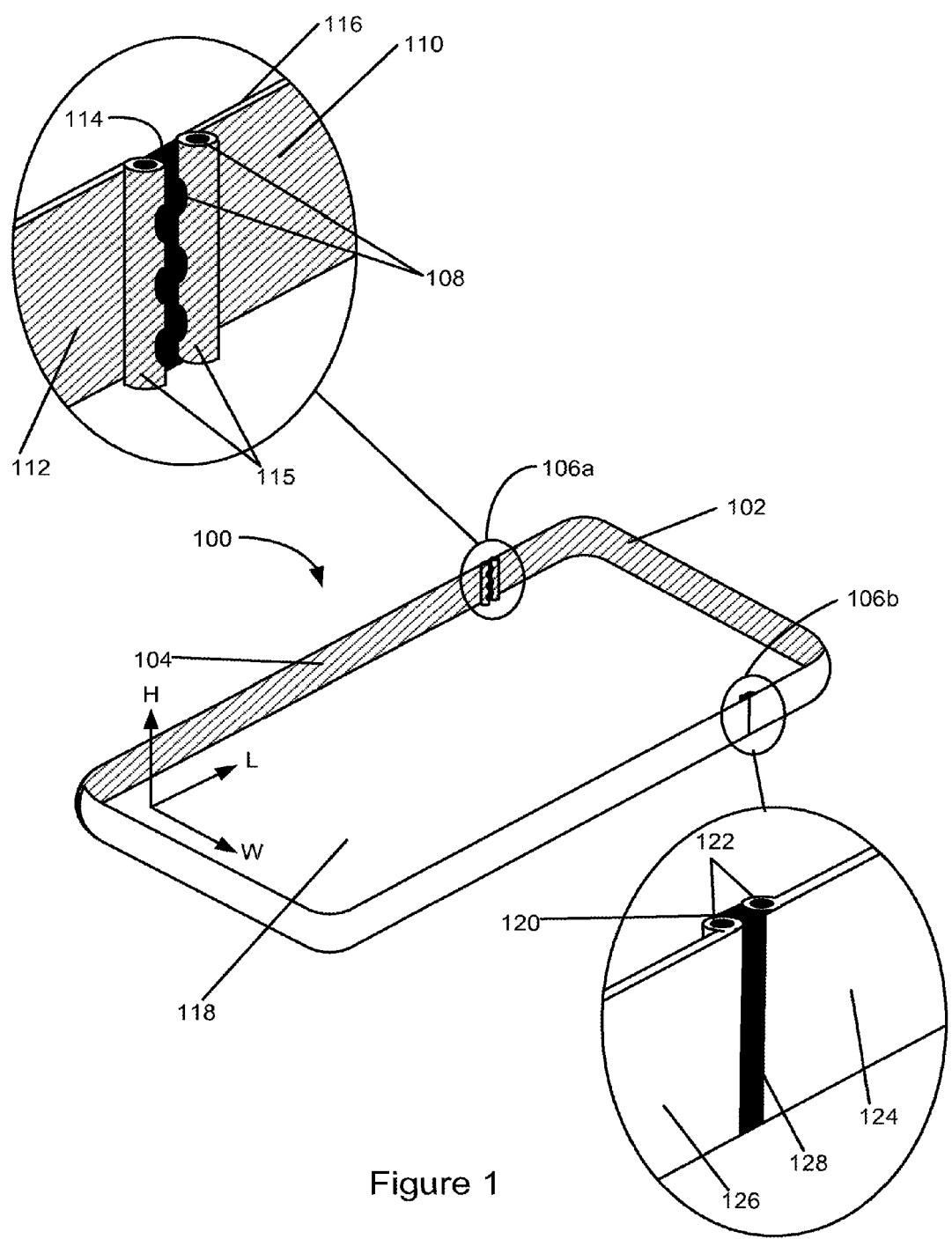
FIG. 1 is a perspective drawing of an external frame component in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Device frames can be formed using metal portions joined using a non-conductive thermoplastic material. The metal portions can be used to form separate antennas for a portable electronic device where the non-conductive thermoplastic material provides RF isolation between the metal portions. The metal portions can be joined in an injection molding process where the thermoplastic material is injected into a joint between the two metal portions.

The device frame, including the metal portion joined by the thermoplastic material, can be a load bearing structure. Thus, to prevent breakage at the metal joints where the thermoplastic material is used, the strength capabilities of the metal components and the joining thermoplastic material need to be somewhat matched. Most thermoplastic materials by themselves have limited strength capabilities. However, the strength materials of a thermoplastic material can be improved by adding a filler material.

In the application described above, where the thermoplastic material provides RF isolation between the components, a relatively non-conductive filler material can be utilized. Glass fibers are one material that are relatively non-conductive and can be used as a filler material with a thermoplastic. The glass fibers can be used to increase the strength properties of the composite material including the filler material and the thermoplastic. For example, a composite material of nylon and glass fibers can be used as a joining material in the example described above where the glass fibers are added to increase the overall strength of the composite material.

One advantage of using nylon and glass fibers is that the composite material is compatible with an injection molding process. In the example described above two metal components are joined using a thermoplastic and filler material, such as nylon and glass fibers. A disadvantage of using glass fibers is that a large fill volume of glass fibers can be needed to form a joint of sufficient strength. As the fill volume of the glass fibers increases, the density and hence the weight of the composite material increases.

Further, even with a high fill volume of glass fibers, a relatively large joint component formed from the composite material can be required to match the strength properties of the surrounding metal. The size of the joint component between the metal components can affect the metal interface that holds the joint component in place. Typically, as the size of the joint component increases, the size of a metal interface associated with holding the joint component in place also increases. Larger components affect both the weight and packaging design associated with a device.

In view of the above, composite materials, such as a thermoplastic including a filler material, are desired that can be used to form device components, such as a frame that are stronger and lighter. The composite materials can be relatively non-conductive so that it can be used to form a joint that provides RF isolation between two metal components. Further, the composite materials can be compatible with an injection molding process. Composite materials with these properties, device components formed using these composite materials and apparatus/methods for forming the device components using the composite materials are described in more detail with respect to the following figures.

In particular, a material mixture including a thermoplastic and a ceramic fiber filler is described with respect to FIG. 1. The use of the material mixture to form a joint between two metal components as part of a frame is also described with respect to FIG. 1. Different device components that can be formed including methods of forming the device components using the material mixtures described herein are discussed with respect to FIGS. 2A-2D. With respect to FIGS. 3A and 3B, two apparatus and methods for forming device composites using the material mixtures are discussed. A flow chart of a method for forming a device component using the material mixtures is discussed with respect to FIG. 4. Finally, one example of a portable device that can utilize the device components described herein and a system diagram of the portable device are described with respect to FIGS. 5A-5C.

In particular embodiments, composite materials can be formed from a thermoplastic mixed with a fiber fill material, such as a ceramic fiber material. As described below, the thermoplastic material and the fiber fill material and their relative volume percentages can be varied. A particular material mixture can be used to form device components with desired properties, such as a desired strength property. In a particular embodiment, the material mixture can be used to form a joint between two components composed of a material different from the material mixture, such as two metal components.

Examples of a thermoplastic that can be used in the material mixture include but are not limited to a polymer matrix, nylon, polycarbonate (PC), Polybutylene terephthalate (PBT), PBT/PC blends, Acrylonitrile Butadiene Styrene (ABS) and PC/ABS blends. One example of a filler material that can be utilized is a ceramic fiber. When the ceramic fiber is used to provide RF isolation and minimize RF loss a material that is relatively non-conductive can be utilized. If RF isolation is not needed, then it may be possible to use a more conductive fiber, such as a carbon fiber. Property ranges of a non-conductive ceramic fiber that can be used as a filler material are described in the following table.

TABLE 1

Ceramic Fiber Properties

| | |
|---|---|
| Density (g/cc) | 2.5-7 |
| Tensile Modulus (GPa) | 100-450 |
| Dielectric Constant | 4-35 |

In various embodiments, the ceramic fibers can be a nonconductive metal oxide, such as an oxide including aluminum, titanium or zirconium. In a particular embodiment, the ceramic fibers can be alumina fibers. In another embodiment, the ceramic fibers can be a titanium oxide, such as titanium dioxide. In yet other embodiments, the ceramic fibers can be formed metal oxides including titanium and aluminum or can be a mixture of alumina fibers and titanium oxide fibers. Other compositions of ceramic fibers are also possible, such a mixture including zirconium, alumina and titanium metal oxides.

The ceramic fibers can be coated to increase bonding between the fibers and the thermoplastic. As an example, continuous strands of the ceramic fibers can be coated and then the fibers can be chopped and mixed with a thermoplastic. The fiber lengths can be between 200-500 microns. In some embodiments, fiber lengths can be up to 1000 microns.

In a particular embodiment, alumina fibers can be mixed with nylon as the thermoplastic. In a preparation device, the thermoplastic and fiber mixture can be bonded together, such as via heating or a chemical reaction, and then extruded as filaments. In one embodiment, the mixture filaments can be chopped to form pellets that are usable in an injection molding process (e.g., see FIG. 3A).

In one embodiment, pigments can be also be added to the mixture of ceramic fibers and the thermoplastic. The pigments can be used to provide materials of different colors. For instance, pigments can be added to produce a material that is white, black or some color in between. When used in an externally visible component, the use of pigments may allow or more aesthetically pleasing component to be produced.

The percent volume of the fiber filler can be selected to achieve a material mixture with particular strength properties. In one embodiment, the components of the material mixture, i.e., the thermoplastic and filler, and their associated percent volume can be selected to provide a tensile strength modulus of about 20 GPa or greater. For instance, a material mixture including nylon with alumina used as a filler can be used to generate a 20 GPa tensile modulus or greater. In one embodiment, alumina fibers of 30 percent by volume or less can be used with nylon. The percent of the ceramic fibers by volume can be varied to produce materials with different properties, such as different strengths and densities.

In general, as the loading volume of the filler material approaches zero, the tensile modulus of the material mixture approaches the tensile modulus of the thermoplastic that is selected. As the loading volume of the material approaches 100% then the tensile modulus of the material mixture approaches the tensile modulus of the filler material. Thus, the tensile modulus of the material mixture can range between the tensile modulus of the thermoplastic and the tensile modulus of the filler material where maximum and minimum values of tensile modulus for the material mixture can depend on the selected materials.

One advantage of using a thermoplastic with a ceramic fiber filler, such as nylon and alumina, over a thermoplastic with glass fibers, such as nylon and glass, is that a lower volume percent of filler material can be used to achieve a similar strength. For instance, 10 volume percent of alumina fibers in nylon can produce a material that is equivalent in strength to about 30 volume percent of glass fibers in nylon. The lower filler volume can produce a material that is comparatively lighter.

Another advantage is a stronger material can be produced. For instance, a material with a 30 volume percent of alumina fibers in nylon can have a modulus that is about 4 times greater than a material with a 30 volume percent of glass fibers in nylon. A larger modulus may allow less material to be used for an equivalent part. For instance, if the nylon/alumina mixture has a strength modulus greater than a nylon/glass mixture, then a joint between two metal components formed using the nylon/alumina mixture can be smaller than a joint between two metal components formed using nylon/glass mixture. A smaller joint may provide benefits such as a lighter weight and a better packing efficiency.

With respect to the following figures, the method and apparatus for forming device components using thermoplastic and ceramic fiber material mixtures are described. The examples are provided for the purposes of illustration and are not meant to be limiting. FIG. 1 is a perspective drawing of an external frame component 100. The external frame component can include two frame parts, 102 and 104. The two portions, 102 and 104, can be joined via interfaces 106a and 106b. The external frame components, 102 and 104, surround area 118. Additional frame parts can be placed in area 118. For instance, in one embodiment, a metal tray can be welded into area 118.

In a particular embodiment, a thermoplastic/ceramic fiber material, such as nylon/alumina described above, can be used in the joint interfaces 106a and 106b to join the two frame parts, 102 and 104. The two frame parts, 102 and 104, can be composed of a material. such as a metal. If the two frame parts are used as part of a wireless antenna, then the thermoplastic/ceramic fiber material can be constructed to be relatively non-conductive so that RF losses between the two frame components are minimized. If RF losses are not important, it might be possible to use a more conductive ceramic fiber, such as a carbon fiber with the thermoplastic in the joint interfaces.

Figure 3A:
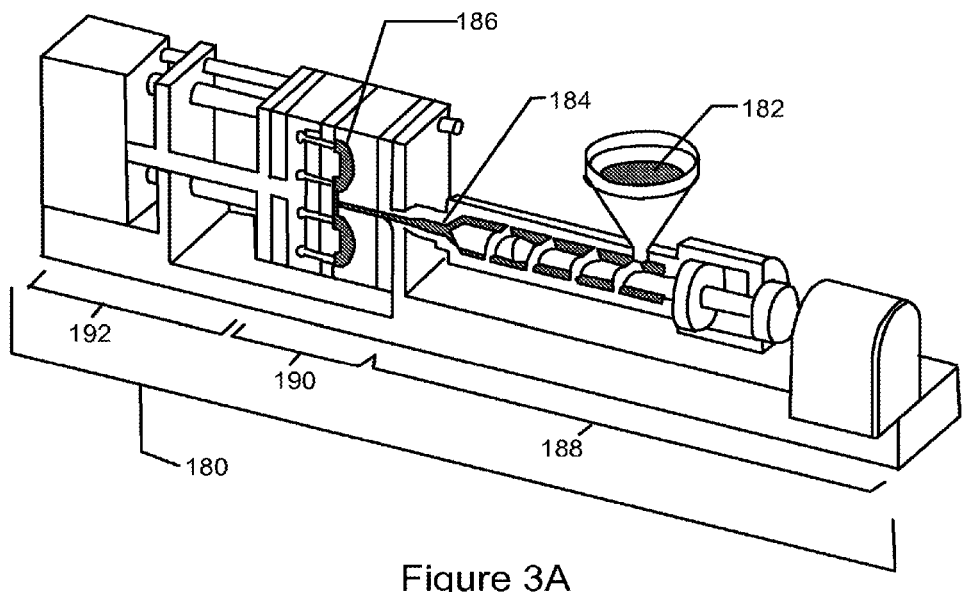
FIGS. 3A and 3B illustrate manufacturing methods for forming components using materials described herein in accordance with the described embodiments.

As an example of forming the joint interfaces 106a and 106b, using injection molding, the thermoplastic/ceramic fiber mixture can be injected at location 128 between the external face 126 of part 104 and face 124 of part 102 at joint interface 106b to form part 120 (Injection molding is described in more detail with respect to FIG. 3A). A similar method can be applied at interface 106a to form part 114. As is described with respect to joint 106a, at the joint interfaces, structures, such as 115, can be provided on the internal surface 112 of part 104 and an internal surface 110 of part 102. The structures, such as 115, can be formed from the same or a different material as parts 102 and 104. A structure 122, similar to structure 115, is provided on the inner surfaces of parts 102 and 104 at joint interface 106b.

The structures, such as 115 and 122, at the joint interfaces 106a and 106b can include hollow portions. When the thermoplastic/ceramic fiber mixture is injected into the joint interfaces, the material mixture can permeate into the hollow portions, such as 108. The mixture can then harden to form parts 114 and 122 that hold the parts 102 and 104 together.

Excess material can be deposited during the injection molding process. For instance, excess material can be deposited on surfaces, such as 126 and 124 on the external surface of joint interface 106b. As another example, excess material can be deposited on internal surface, such as onto the structures 115 and the possibly the surrounding surfaces 110 and 112. Also, excess material can be extruded above and/or below the joint interface. If desired, for aesthetic or packaging purposes, excess material can be removed from external, internal, top and/or bottom surfaces surrounding the joint interfaces in a post injection molding finishing step.

As is described above, a nylon/alumina fiber mixture can be stronger than a nylon/glass fiber mixture. The use of a stronger material can affect the design of the joint interfaces 106a and 106b. For instance, when a stronger material is used relative to a less strong material, it may be possible to reduce the size of the interface structures, 114 and 120, as well as the support structures, 115 and 122. Reducing the size of these structures can reduce the weight of the device and improve the packaging design.

Figure 2A:
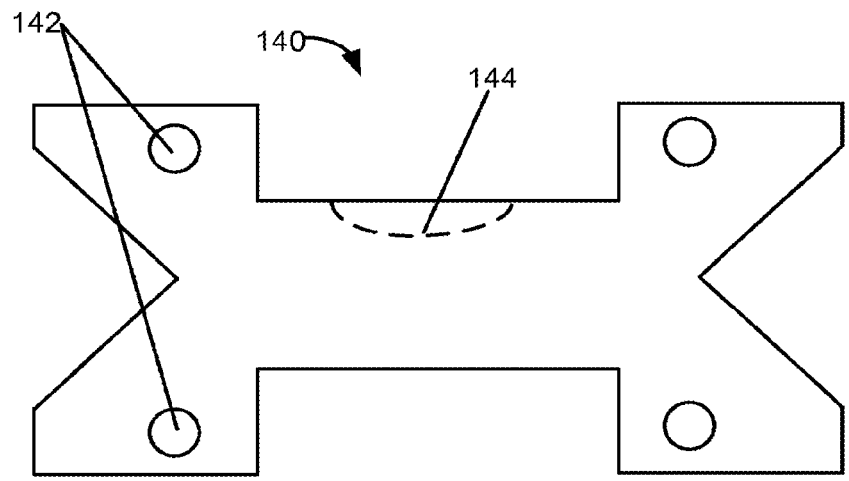
FIGS. 2A and 2B show top views of device components in accordance with the described embodiments.
Figure 2B:
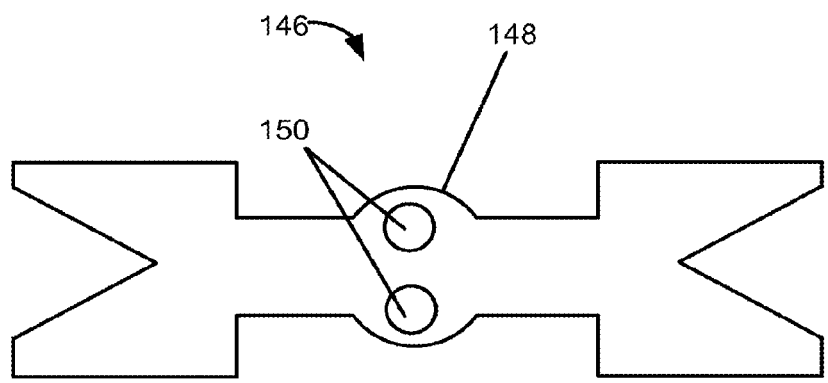

With respect to FIG. 1, the use of a thermoplastic/ceramic fiber material was described in relation to forming a frame component usable in an electronic device where the thermoplastic/ceramic fiber material is used to form a joints that hold parts of the frame components together With respect to FIGS. 2A-2D, other device components that can be formed using the thermoplastic/ceramic fiber materials are described. FIGS. 2A and 2B show top views of device components 140 and 146. The device components can be formed using an injection molding process. In one embodiment, the device components can be used as part of an internal frame component, casing or support structure.

As shown in the FIGS. 2A and 2B, the parts 140 and 146, can be formed straight or curved surfaces, such as 148. If an injection molding process is used, the mold can include blocked out regions that allow apertures, such as 142 and 150, to be formed. During the injection molding process, the thermoplastic/ceramic fiber material can flow around the blocked out regions to form the apertures. These apertures can be used with a fastener to secure the parts, such as 140 and 150, within a structure or attach other components to the parts.

In one embodiment, the apertures, such as 142 and 150, can be formed as part of a post-finishing step after the injection molding. For instance, after the parts 140 and 150 harden, the apertures, such as 142 and 150, can be drilled into parts at desired locations. In yet other embodiments, additional shaping of a part can be performed after injection molding. For example, a cut can be made along line 144 on part 140 to provide the final shape of part 140. As described above, as part of the post-injection molding process, excess material can be removed from a part, such as 140 and 146, to eliminate imperfections generated during the injection molding process.

Figure 2C:
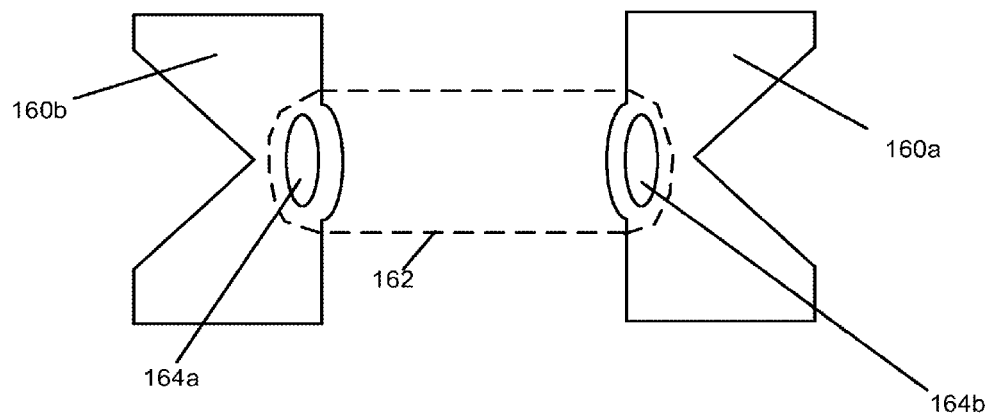
FIGS. 2C and 2D show top views of a device component formed using an injection molding process in accordance with the described embodiments.
Figure 2D:
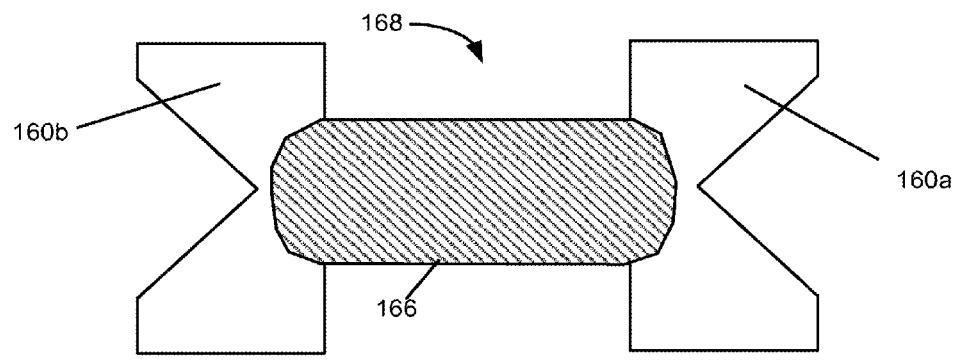

FIGS. 2C and 2D show top views of a frame component 168 that can be formed using an injection molding process. In FIG. 2C, two portions, 160a and 160b, can be secured in a frame associated with a molding unit. The molding unit can be used to guide the placement of the material that occurs during the injection molding process. The two portions, 160a and 160b, can include apertures 164a and 164b. The molding unit can be constructed such that a thermoplastic/ceramic fiber material fills in the area 162 including filling in each of the apertures 164a and 164b. The shape, size and number of apertures in each of the components 160a and 160b can be selected so that a strong bond is formed between the components 160a and 160b and the injection molding material.

FIG. 2D shows a part 168 that can be formed after injection molding. A solid block 166 can be formed from the injection molding material. It extends into the apertures 164a and 164b. As described above, excess material can be removed from the solid block 166 and the surrounding components, such as 160a and 160b, in a post-injection molding finishing step if desired. Next, with respect to FIGS. 3A and 3B, examples of apparatuses and methods of forming device components using the thermoplastic/ceramic fiber materials described herein are discussed.

FIG. 3A shows a perspective drawing of an injection molding unit 180 with a partial cut-away showing the injection path in the injection unit and molding unit 190. Raw material 182 can be added in the cone. The raw material 182 can be one of the thermoplastic/ceramic fiber materials described above. In one embodiment, it can be provided in a pellet form. In the injection unit 188, the raw material 182 can be melted and the melted material 184 injected into the molding unit 190 to form a molded part 186.

The clamping unit 192 can be used to bring a molding unit, such as 190, in contact with the melted material as part of the injection molding process. Once the melted material 184 hardens, the clamping unit 192 can separate the molding unit 190 in some way to allow a completed part to be removed. Then, if used, additional component parts can be loaded into the molding unit, such as metal frame component parts, and the process can be repeated.

As an example, the clamping unit 192 can be opened to allow a molding unit to be loaded with frame parts, such as 102 and 104, shown in FIG. 1. The molding unit 190 can then be clamped together and melted material 184 can be injected into the joint interfaces, 106a and 106b, between the frame parts 102 and 104, to form the joints 114 and 122. After the joints harden, the clamping unit 192 can separate the molding unit 190. Then, the frame component 100 including frame parts 102, 104 and joints 114, 122, can be removed. New frame parts, 102 and 104, can be loaded into the molding unit 190 and the process can be repeated. The removed frame component 100 can be taken to another device, such as a polishing device, for post-injection molding finishing of the frame component.

Figure 3B:
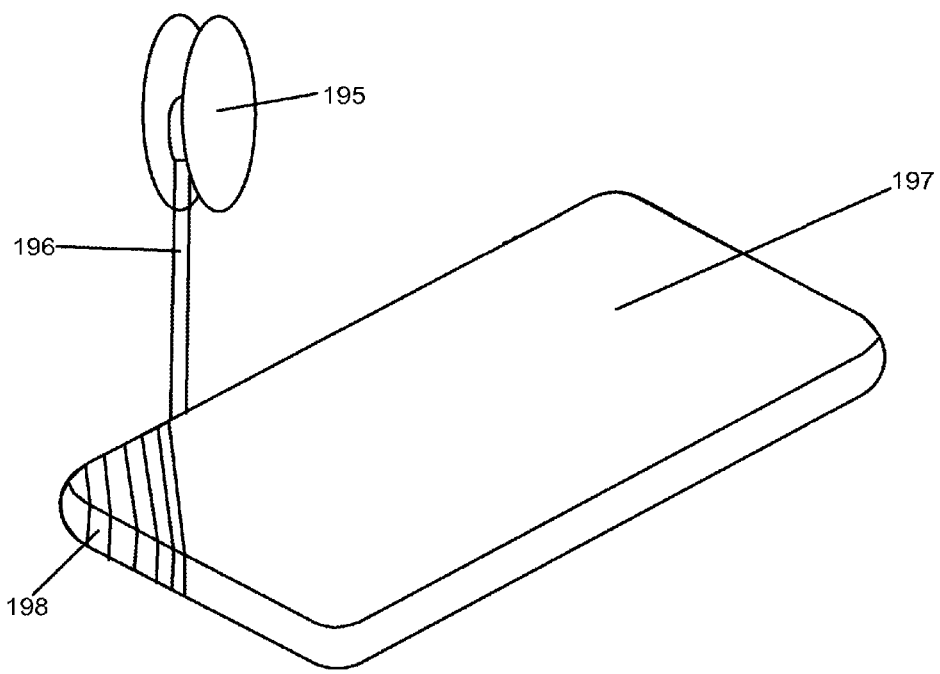

In alternate embodiment, the ceramic fibers, such as alumina fibers, described herein can be formed into continuous strands. If desired, the continuous strands can be woven together as a mat with a particular width and thickness. The mat can be rolled onto a spool. In FIG. 3B, a spool 196 with strands of ceramic fibers or a mat of ceramic fibers is shown.

To produce a device component, such as a case for an electronic device, a forming element, such as 197, can be provided. Then, mechanisms attached to the spool 195 and/or the forming element 197, can be used to wrap the material from the spool 195 around the forming element 197. For instance, the forming element 197 can be rotated while the spool 195 is moved in a linear fashion. The layers of material including the ceramic fiber from the spool 195 can be overlapped to form a case structure. The fiber layers can be coated 196 in a substance such as an organic resin to bond the layers together as they are wrapped around the forming element 197. The bonds between the layers are set as the resin hardens. A partially formed case 198 including a number of overlapping ceramic fiber layers bonded together via a resin is shown in FIG. 3B.

After a case is formed, a number of post finishing steps can be performed. For instance, the case can be cut to remove the forming element 197. As another example, an aesthetic finishing layer can be applied over the case. Further, the case can be machined in some manner. For instance, portions of the case can be removed to provide entry ports for various device interfaces, such as a cut-out for a data/power interface.

Figure 4:
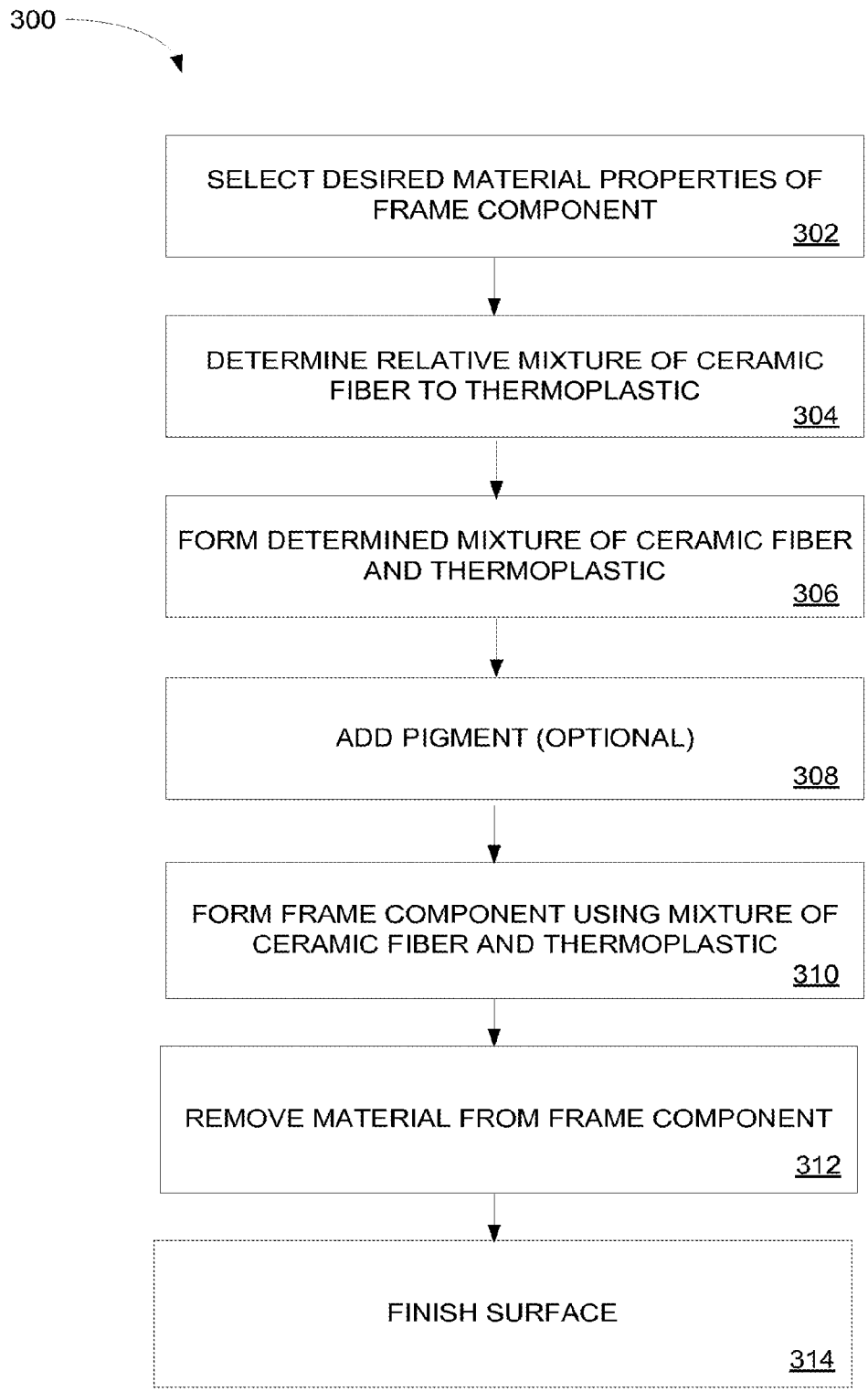
FIG. 4 is flow chart of a method of forming a device component in accordance with the described embodiments.

Next, with respect to FIG. 4, a method 300 of forming a device component using the materials described herein is described. In 302, the desired material properties of a device component, such as a frame component can be determined. For instance, a desired tensile modulus and conductivity for the material can be selected. In 304, a thermoplastic material, a ceramic fiber filler material and a percent volume of each material can be determined that produces a composite material with the desired material properties. For instance, in one embodiment, the composite material can be constructed to have a tensile modulus greater than 20 GPa.

In 306, a composite material including a ceramic fiber filler material and a thermoplastic material in some relative ratio can be formed that satisfies the desired material properties selected in 302. In one embodiment, the composite material can be usable in an injection molding unit, such as the unit described with respect to FIG. 3A. The ceramic fiber filler material can be coated to allow the ceramic fibers to bond to the thermoplastic material. In a particular embodiment, composite material can be formed from coated alumina fibers bonded to nylon.

In 308, a pigment can be optionally added to the composite material. The pigment can be added to improve the aesthetic appeal of a device formed using the composite material. The pigment can be used to affect the color of the material formed in 306. Using a pigment, composite materials that are white, black or of various colors can be generated.

In 310, a device component, such as a frame component, can be formed using the composite material including the thermoplastic loaded with ceramic fibers. In one embodiment, the composite material can be used in an injection molding unit. In 312, excess material can removed from the formed device component, such as frame component. In addition, additional cuts or apertures can be made in the frame component to complete its shaping. For example, apertures can be drilled into a part formed using the composite material in an injection molding unit. In 314, surface finishing, such as polishing, can be applied to the component formed in 310. One or more of the steps in method 300 can be implemented using a computer controlled manufacturing process. Thus, the described embodiments can also be embodied as computer readable code on a computer readable medium for controlling manufacturing operations or as computer readable code on a computer readable medium for controlling a manufacturing line.

Figures 5A, 5B:
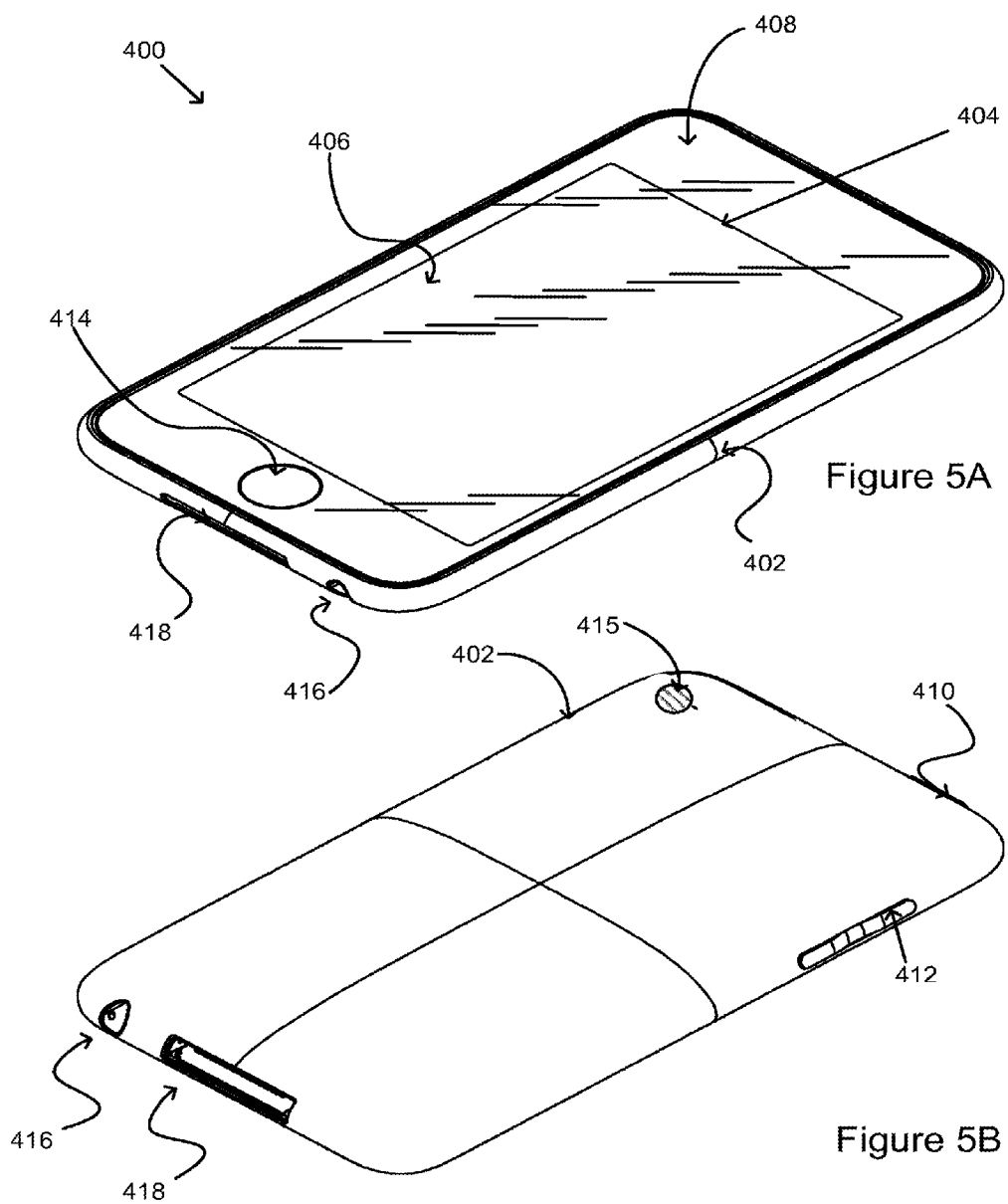
FIG. 5A shows a top view of a portable electronic device in accordance with the described embodiments.
FIG. 5B shows a bottom view of a portable electronic device in accordance with the described embodiments.

FIGS. 5A and 5B show a top and bottom view of a portable computing device 400 in accordance with the described embodiments. The portable computing device can include one or more components formed using the thermoplastic and ceramic fiber material mixture described above. The portable computing device can be suitable for being held in hand of a user. A cover glass 406 and a display 404 can be placed within an opening 408 of housing 402. The cover glass can include an opening for an input mechanism, such as input button 414. In one embodiment, the input button 414 can be used to return the portable computing device to a particular state, such as a home state.

Other input/output mechanisms can be arranged around an periphery of the housing 402. For instance, a power switch, such as 410 can be located on a top edge of the housing and a volume switch, such as 412, can be located along one edge of the housing. An audio jack 416 for connecting headphones or another audio device and a data/power connector interface are located on the bottom edge of the housing. The housing 400 also includes an aperture for a camera 415 that allows video data to be received.

Figure 5C:
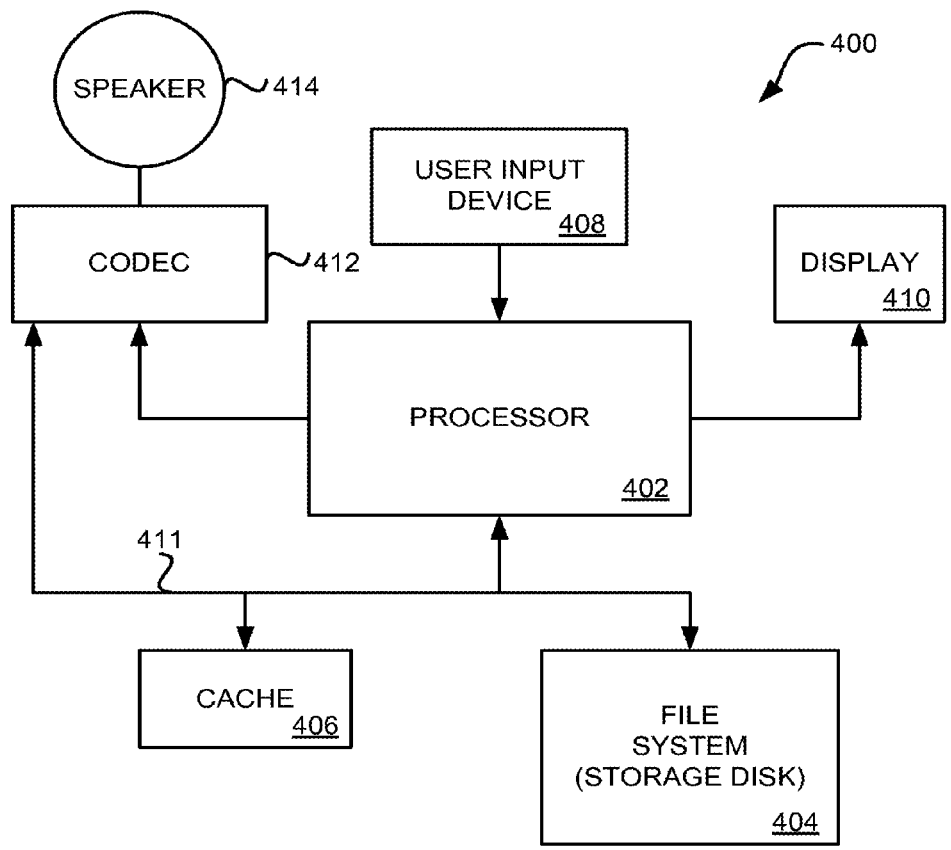
FIG. 5C is a block diagram of a media player in accordance with the described embodiments.

FIG. 5C is a block diagram of a media player 500 in accordance with the described embodiments. The media player 500 includes a processor 502 that pertains to a microprocessor or controller for controlling the overall operation of the media player 500. The media player 500 stores media data pertaining to media items in a file system 504 and a cache 506. The file system 504 is, typically, a storage disk or a plurality of disks. The file system typically provides high capacity storage capability for the media player 500. However, since the access time to the file system 504 is relatively slow, the media player 500 also includes a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504.

Further, the file system 504, when active, consumes more power than does the cache 506. The power consumption is particularly important when the media player 400 is a portable media player that is powered by a battery (not shown).

The media player 500 also includes a user input device 408 that allows a user of the media player 500 to interact with the media player 500. For example, the user input device 508 can take a variety of forms, such as a button, keypad, dial, etc. Still further, the media player 400 includes a display 510 (screen display) that can be controlled by the processor 502 to display information to the user. A data bus 111 can facilitate data transfer between at least the file system 504, the cache 506, the processor 502, and the CODEC 512.

In one embodiment, the media player 500 serves to store a plurality of media items (e.g., songs) in the file system 504. When a user desires to have the media player play a particular media item, a list of available media items is displayed on the display 510. Then, using the user input device 508, a user can select one of the available media items. The processor 502, upon receiving a selection of a particular media item, supplies the media data (e.g., audio file) for the particular media item to a coder/decoder (CODEC) 512. The CODEC 512 then produces analog output signals for a speaker 514. The speaker 514 can be a speaker internal to the media player 500 or external to the media player 100. For example, headphones or earphones that connect to the media player 500 would be considered an external speaker.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic device, comprising:
an external enclosure, comprising:
a first conductive metal component; and a separate second conductive metal component, wherein at least one of the first conductive metal component and the second conductive metal component functions as a wireless antenna to provide radio-frequency communication for the electronic device;

wherein the first conductive metal component and the second conductive metal component are part of an external frame or an internal frame for the electronic device;

a non-conductive interface component molded between adjacent edges of the first and second conductive metal components and that rigidly joins the first and second conductive metal components to form a least a portion of the enclosure, the non-conductive interface component providing radio frequency isolation between the first conductive metal component and the second conductive metal component and wherein the non-conductive interface component is formed from a composite material comprising:

a non-conductive thermoplastic material; and
a non-conductive ceramic fiber filler material within the thermoplastic material; and
a processor received within the external enclosure and operatively connected to the wireless antenna.

2. The electronic device of claim 1, wherein the non-conductive thermoplastic material is nylon and the non-conductive ceramic fiber filler material is alumina.

3. The electronic device of claim 1, wherein the first conductive metal component and the second conductive metal component are formed from aluminum.

4. The electronic device of claim 1, wherein the non-conductive thermoplastic material comprises a pigment.

5. The electronic device of claim 1, wherein the non-conductive ceramic fiber material comprises a pigment.

6. The electronic device of claim 1, wherein the non-conductive interface component, the first conductive metal component and the second conductive metal component function as a load bearing structure.

7. An electronic device, comprising:
a housing component enclosing various electronic components of the electronic device, the housing component having a first conductive metal portion and a second conductive metal portion, wherein at least one of the first conductive metal portion and the second conductive metal portion functions as a wireless antenna to provide radio frequency communication for the electronic device;

wherein the first conductive metal portion and the second conductive metal portion are part of an external frame or an internal frame for the electronic device; and a non-conductive material formed from nylon and coated alumina fibers bonded together, the non-conductive material:

molded between adjacent edges of the first conductive metal portion and the second conductive metal portion to form a rigid coupling between the first and second metal portion; and providing radio frequency isolation between the first conductive metal portion and the second conductive metal portion.

8. The electronic device of claim 7, wherein
the nylon and coated alumina fibers are combined in a pellet structure operable for injection molding.

9. The electronic device of claim 7, wherein the non-conductive material comprises a pigment.

10. The electronic device of claim 7, wherein the first conductive metal portion and the second conductive metal portion is a load bearing structure.

11. The electronic device of claim 7, further comprising a processor disposed within the housing and communicatively coupled to the wireless antenna.

12. An electronic device, comprising:
an external enclosure comprising:
a first conductive metal component; and
a second metal conductive component, wherein the first conductive metal component and the second conductive metal component function as an antenna to provide communication functionality for the electronic device;

wherein the first conductive metal component and the second conductive metal component are part of an external frame or an internal frame for the electronic device; and a non-conductive thermoplastic interface component molded between adjacent edges of the first conductive metal component and the second conductive metal component that rigidly joins the first conductive metal component and the second conductive metal component and provides radio frequency isolation between the first conductive metal component and the second conductive metal component; and a processor within the external enclosure and operatively coupled to the antenna.

13. The electronic device of claim 12, wherein the non-conductive interface component is formed from a composite material comprising a thermoplastic material and a non-conductive ceramic fiber filler material.

14. The electronic device of claim 13, wherein the non-conductive ceramic fiber filler material is disposed within the thermoplastic material.

15. The electronic device of claim 13, wherein the non-conductive material comprises a non-conductive metal oxide.

16. The electronic device of claim 12, wherein the non-conductive interface component comprises a pigment.

17. The electronic device of claim 12, wherein the non-conductive interface component is injection-molded between the first conductive metal component and the second conductive metal component.

18. The electronic device of claim 12, wherein the first conductive metal portion and the second conductive metal portion is load bearing.

19. The electronic device of claim 12, wherein the non-conductive interface component comprises:
a non-conductive thermoplastic material; and
a non-conductive ceramic fiber filler material.

* * * * *